H. STAGER.
BRAKE BLOCK CLUTCH.
APPLICATION FILED JAN. 27, 1913.
1,100,996.
Patented June 23, 1914.
2 SHEETS—SHEET 1.
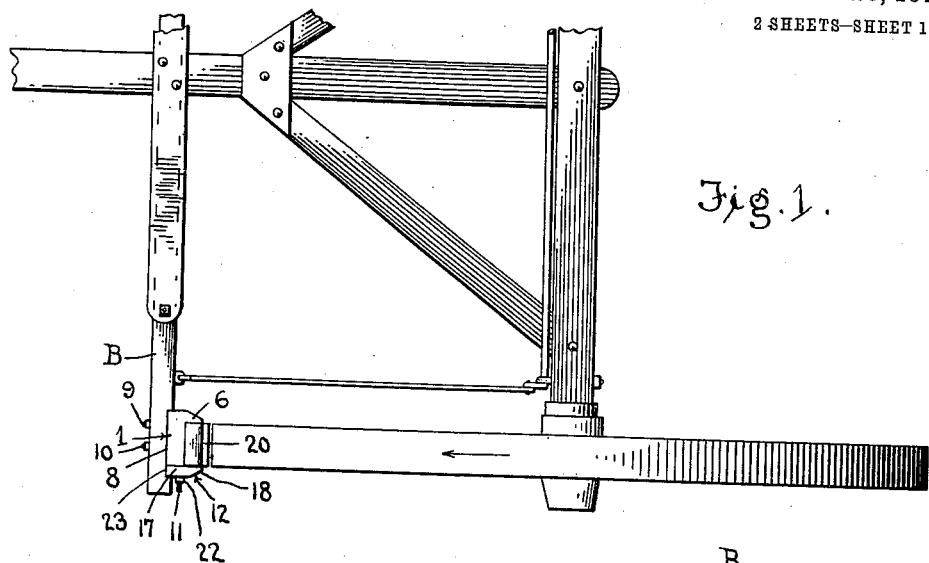
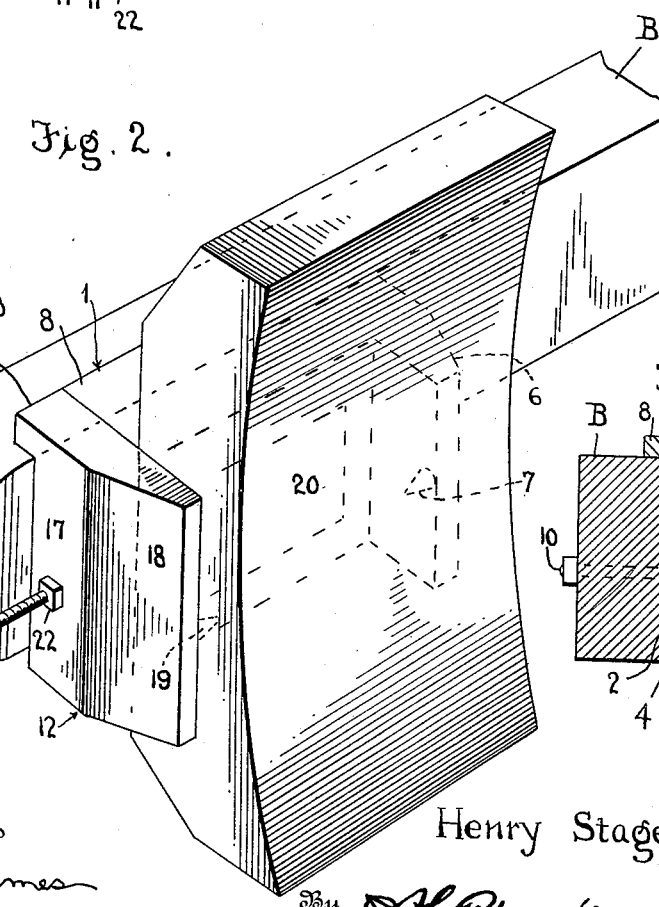
Witnesses
L. B. James
C. E. Hunt
Inventor
Henry Stager
By H. B. Willson & Co.
Attorneys

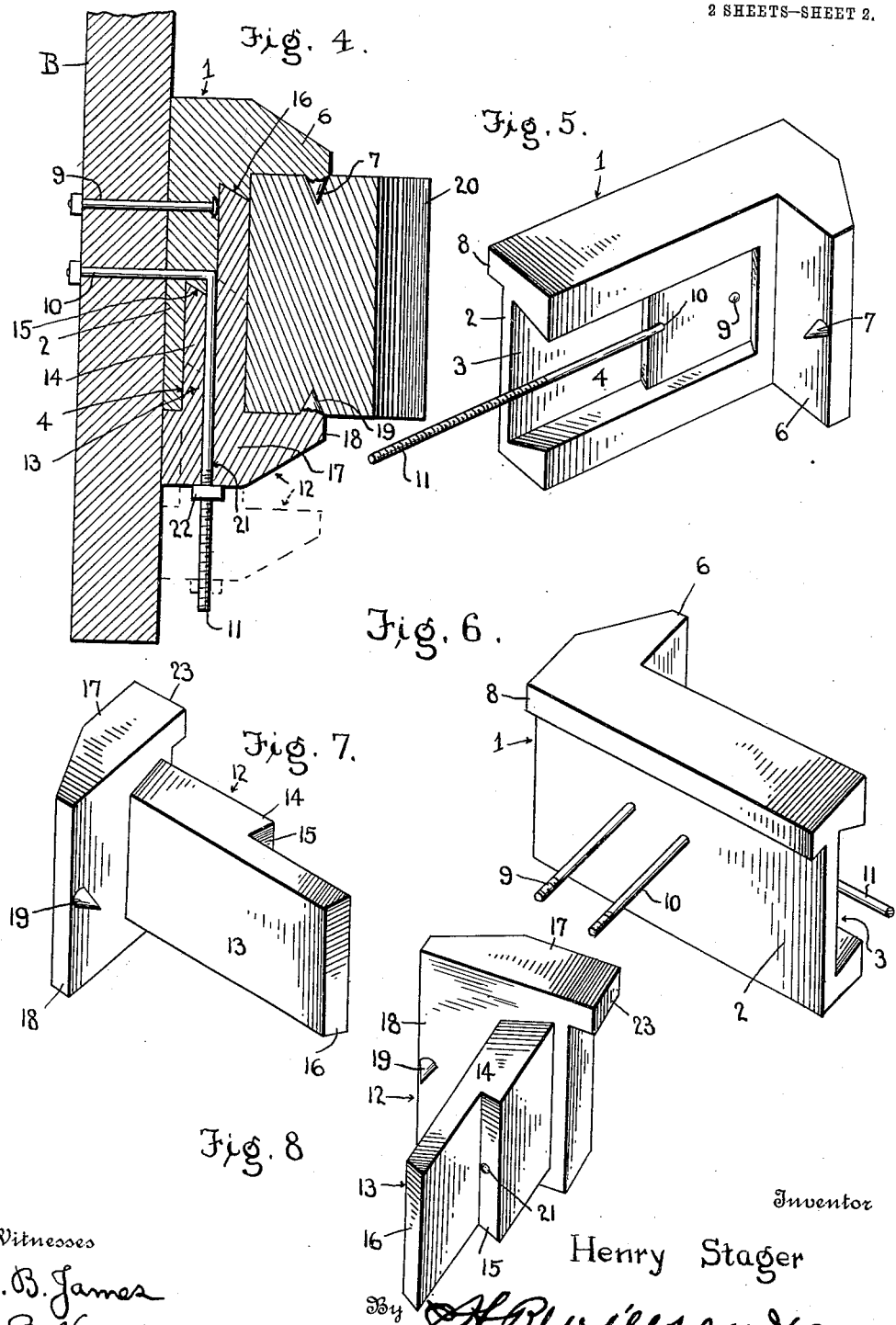

UNITED STATES PATENT OFFICE.

HENRY STAGER, OF HAMSFORK, WYOMING.

BRAKE-BLOCK CLUTCH.

1,100,996.  Specification of Letters Patent.  Patented June 23, 1914.

Application filed January 27, 1913.   Serial No. 744,464.

*To all whom it may concern:*

Be it known that I, HENRY STAGER, a citizen of the United States, residing at Hamsfork, in the county of Lincoln and State of Wyoming, have invented certain new and useful Improvements in Brake-Block Clutches; and I do declare the following to be a full, clear, and exact description of the invention, such as will enable others skilled in the art to which it appertains to make and use the same.

This invention relates to improvements in clutches or holders for brake blocks.

One object of the invention is to provide a clutch of this character formed in sections having adjustable connecting means whereby brake blocks of different widths may be securely fastened therein and secured thereby to a brake beam.

Another object is to provide an adjustable brake block clutch which will be simple, strong, durable and inexpensive in construction, efficient and reliable in operation and may be attached to any brake beam.

With these and other objects in view, the invention consists of certain novel features of construction, and the combination and arrangement of parts as will be more fully described and claimed.

In the accompanying drawings; Figure 1 is a plan view of one of the rear wheels and a portion of the running gear of a vehicle showing my improved clutch applied to the brake beam thereof; Fig. 2 is an enlarged perspective view of one end of the brake beam showing the brake block secured thereto by my improved clutch; Fig. 3 is a vertical cross sectional view through the end of the beam and through the clutch; Fig. 4 is a horizontal sectional view of the same; Fig. 5 is a perspective view of the outer side of one member of the clutch; Fig. 6 is a similar view of the inner side of the clutch member shown in Fig. 5. Fig. 7 is a perspective view of the outer side of the other member of the clutch; and, Fig. 8 is a similar view of the outer side of the clutch member shown in Fig. 7.

My improved clutch comprises a stationary member 1 which is bolted or otherwise securely fastened to the brake beam B and which consists of a beam engaging plate 2 having in its outer side a longitudinal dovetail shaped recess 3 which opens through the inner end of the member and is of greater depth at the inner end thereof as shown at 4 and thus provides a shoulder 5 which is located substantially midway the length of the recess as shown. On the outer end of the member 2 is formed a right angular outwardly projecting block gripping jaw 6 on the inner side of which near its outer edge is a centrally disposed spur 7 the purpose of which will be hereinafter described. The outer side of the jaw 6 is preferably beveled as shown. On the inner side of the member 2 at the upper side thereof is a right angular offset stop flange 8 which when the member 2 is in position on the end of the brake beam, engages the upper side of the beam. The flange 8 when thus engaged with the brake beam supports the member 2 of the clutch and serves to resist the strain applied thereto when the brake block is engaged with the wheel. The member 2 of the clutch is further rigidly secured to the brake beam by a fastening bolt 9 which is inserted through said member and through the brake beam as shown. Also engaged with the clutch member 2 and end of the beam is the right angular inner end 10 of a combined clutch fastening and adjusting bolt 11 the outer end of which is engaged with the adjustable opposing member of the clutch hereinafter described. The movable or adjustable member 12 of the clutch comprises a plate 13 corresponding in size and shape to the recess 4 in the outer side of the clutch member 2 with which said movable member 12 is adjustably engaged. The plate 13 has its edges dove-tailed to fit the dove-tailed sides of the recess 4 and has the outer portion thereof increased in thickness on its inner side as shown at 14 thereby forming a shoulder 15 midway between the ends of the plate, said shoulder 15 being adapted to engage the shoulder 5 in the recess 4 of the member 2 when said members are brought together. The shoulders 4 and 5 are inclined inwardly or undercut as clearly shown in Fig. 4 of the drawings, so that when said shoulders are brought together they form an interlocking engagement. The outer end of the recess 4 and the engaging end of the plate 13 are also inclined and form an interlocking engagement as clearly shown at 16 in Fig. 4 of the drawings. The interlocking engagement of the shoulders 5 and 15 and the ends of the plate 13 and recess 4 together with the interlocking engagement of the dove-tailed edges of the plate 13 and sides of the recess 4 firmly secures the members of the clutch in operative engagement and prevents any possibility of the member 13 becoming disengaged from the stationary member of the clutch. On the outer end of the plate 13 is a head 17 which corresponds in size to the outer end of the member 2 of the clutch and has formed thereon an outwardly extending and gripping jaw 18 which corresponds with the jaw 6 on the member 2 and is provided with a spur 19 which together with the spur 7 of the jaw 6 is adapted to be forced into the opposite sides of the brake block 20 when gripped by and clamped between the jaws 6 and 18 of the clutch members, said spurs thus securely holding the brake block against slipping between the clutch members.

The head 17 and outer portion of the plate 13 of the adjustable clutch member 12 are provided with a centrally disposed bolt hole 21 which is adapted to receive the right angular laterally extending end 11 of the bolt 10 as clearly shown in Fig. 4 of the drawing. The end 11 of the bolt is of greater length than the clutch member 12 and thus permits said member to be adjusted on the bolt and in the clutch member 2 whereby brake blocks of different widths may be engaged with the clutch and secured thereby to the brake beam. On the threaded outer end of the right angular portion 11 of the bolt 10 is a clamping nut 22 which is adapted to be screwed up into engagement with the member 12 of the clutch whereby said member is drawn up into engagement with the brake block 20 and clamps the latter between the jaws 6 and 18 of said members as is clearly shown in Figs. 2 and 4 of the drawing.

On the inner side of the head 17 of the clutch member 12 adjacent to the upper end of the head is a right angular offset flange 23 which when the clutch member 12 is in place engages the upper side of the brake beam and supports the member 12 of the clutch. The flange 23 of the clutch member 12 together with the flange 8 of the clutch member 2 when engaged with the upper side of the brake beam effectually resist the strain applied to the brake block when the latter is engaged with the wheel and relieves the bolts 9 and 10 of this strain, thus obviating any danger of the bolts being broken or cut when the brakes are applied. By constructing my improved brake block holder or clutch as herein shown and described it will be seen that the movable member of the clutch may be readily adjusted with respect to the stationary member thereof to receive brake shoes of different width and to securely fasten said shoes in operative position on the ends of a brake beam.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A brake block clutch comprising a stationary member adapted to be secured to a brake beam, an adjustable member adapted to slidably engage said stationary member, brake block engaging means on said members, spurs on said block engaging means adapted to engage the brake block, a clamping bolt engaged with said stationary member and with the brake beam and having a right angular threaded outer end adapted to engage said movable member, and a clamping nut engaged with the end of said bolt.

2. A brake block clutch comprising a stationary member adapted to be secured to a brake beam and having in its outer side a longitudinal recess provided with dovetailed shaped edges, an adjustable member comprising a plate having dovetailed edges adapted to form a sliding interlocking engagement with the dovetailed sides of the recess in said stationary member, brake block engaging jaws on said members, spurs on said jaws and adapted to be forced into the brake block, a clamping bolt engaged with said stationary member of the clutch and with the brake beam and having a right angular threaded outer end adapted to engage said movable member of the clutch whereby said movable member is adjustably secured to the stationary member, and a clamping nut engaged with the threaded end of said bolt to draw said movable member toward said stationary member of the clutch and to thereby clamp a brake block between said members.

3. In a brake block clutch, a stationary member comprising a plate having in its outer side a longitudinal recess provided with dovetailed shaped sides, an outwardly extending gripping jaw on one end of said member, a block engaging spur on said jaw, a stop on the upper edge of said plate and adapted to rest on the upper edge of the brake beam, a movable member comprising a plate adapted to be slidably engaged with the recess in said stationary member, said plate having dovetailed shaped edges to engage the dovetailed walls of said recess, a head on the outer end of said plate, a gripping jaw formed on said head, a spur on said jaw to engage the brake block, a stop on the upper end of said head to engage the upper side of the brake beam, and a clutch adjusting bolt fixed at one end in a brake beam and in the stationary member of the clutch and having a right angular threaded outer end adapted to receive and slidably support the movable member of the clutch and a nut engaged with the threaded end of the bolt whereby said movable member is adjusted to clamp a brake block between the same and the stationary member of the clutch.

In testimony whereof I have hereunto set my hand in presence of two subscribing witnesses.

HENRY STAGER.

Witnesses:
  BEN BOYNELL,
  J. H. MANTLE.

Copies of this patent may be obtained for five cents each, by addressing the "Commissioner of Patents, Washington, D. C."